(12) United States Patent
Charlier et al.

(10) Patent No.: US 6,334,063 B1
(45) Date of Patent: Dec. 25, 2001

(54) ELECTRONIC DEVICE WITH AUTO-POSITIONING VIRTUAL IMAGE DISPLAY AND ASSOCIATED METHOD

(75) Inventors: Michael L. Charlier, Palatine; Thomas J. Walczak, Woodstock; Michael W. Schellinger, Arlington Heights; Scott B. Davis, Buffalo Grove, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/213,566

(22) Filed: Dec. 17, 1998

(51) Int. Cl.⁷ ............................... H04B 1/38; G09G 5/00
(52) U.S. Cl. ............................. 455/566; 455/575; 345/7
(58) Field of Search ........................... 455/566, 568, 455/569, 575, 90, 556; 379/88.13, 433, 429, 434; 345/7–9

(56) References Cited

U.S. PATENT DOCUMENTS

| | | | | |
|---|---|---|---|---|
| 5,491,507 | * | 2/1996 | Umezawa et al. .................... | 455/556 |
| 5,867,795 | * | 2/1999 | Novis et al. ........................... | 455/566 |
| 5,970,418 | * | 10/1999 | Budd et al. ............................ | 455/566 |
| 6,073,033 | * | 6/2000 | Campo .................................. | 455/566 |
| 6,073,034 | * | 6/2000 | Jacobsen et al. ..................... | 455/566 |
| 6,085,112 | * | 7/2000 | Kleinschmidt et al. .............. | 455/556 |

FOREIGN PATENT DOCUMENTS

| | | | | |
|---|---|---|---|---|
| 0817393A2 | | 7/1998 | (EP) ............................... | H04B/1/38 |
| 2-158437 | * | 6/1990 | (JP) ......................................... | 345/7 |

* cited by examiner

Primary Examiner—Lester G. Kincaid
(74) Attorney, Agent, or Firm—Brian M. Mancini

(57) ABSTRACT

A gravity switch and a microprocessor are disposed in an electronic device having a virtual image display. The gravity switch provides a determination of the electronic device's orientation to the microprocessor. The microprocessor provides a display signal to the virtual image display based on the orientation of the electronic device. The microprocessor rotates the input from a display interface based on the orientation of the electronic device. The microprocessor includes a time hysteresis to prevent inadvertent changes to the image orientation due to momentary movements of the electronic device.

6 Claims, 6 Drawing Sheets

ELECTRONIC DEVICE WITH AUTO-POSITIONING VIRTUAL IMAGE DISPLAY AND ASSOCIATED METHOD

FIELD OF THE INVENTION

The present invention relates generally to electronic devices having an image display. More particularly, the present invention relates to portable electronic devices with a virtual image display.

BACKGROUND OF THE INVENTION

Consumers want portable electronic devices that display alphanumeric and graphical messages in the proper position regardless of the orientation of the electronic device. These electronic devices include compact disc players, two-way radios, cellular telephones, computers, and similar devices. To show graphical images and alphanumeric messages, such devices typically have a virtual image display although other types of displays may be used.

In use, the display projects an image in a fixed orientation relative to the electronic device. For example, the top of the image is oriented usually with the top of the device. To see the image properly, a user must hold the electronic device in the proper position. The electronic device is limited to uses related generally to the fixed position of the image. Of course, other uses are possible if the user wants to view an image upside down, sideways, or other awkward position. Generally, this scenario is not the case. Consequently, there is a problem when a user wants to use an electronic device in a position for which the display was not designed to project the image.

Many cellular telephones are designed for hands-on use with the image having the same orientation as the phone—top of the image oriented with the top of the phone. When used hands-free, the hands-on phone may be inverted for use such as when it is clipped to the visor of an automobile. In this situation, the display image would be appear upside down to the user.

In the prior art, a virtual image display is mounted tangentially to an electronic device. The image can be viewed properly with the electronic device in only one position. The user must hold the electronic device with the virtual image display in front of the proper eye. If the user switches the electronic device to the other eye, the image will appear upside down and backwards. If the user views the electronic device from the top such as when it is held on a belt, the image will appear sideways. Hence, there is a need for an electronic device with an auto-positioning virtual image display.

In addition, the image controls need to operate in relation to the changing orientation of the image. In a device with a fixed-orientation image, the image controls operate in a fixed relation to the orientation of the image. For example, some displays include a switch to scroll through a message. To scroll in a particular direction, the user moves the switch in the same direction. The user moves the switch toward the top of the display to scroll toward the top of the image. This design works because the image has a fixed orientation. However, this design would not work appropriately if the orientation of the image changes. If the orientation of the image is 90 degrees different from the display orientation, then the inputs from the imagine controls need to rotate by the same 90 degrees in order to work properly with the image. In this example, if the image controls did not rotate to the same degree as the image orientation, then moving the scrolling switch toward the top of the display would cause the image to scroll sideways.

Accordingly, there is a need for an electronic device with an auto-positioning virtual image display in which the image controls operate in relation to the changing orientation of the image.

SUMMARY OF THE INVENTION

As discussed in greater detail below, the present invention overcomes the limitations of the existing art. The primary object of the present invention is to provide an electric device and method for automatically orienting the image and controls of a virtual display regardless of the position of the electronic device. This object and other benefits are achieved by the present invention.

In the present invention, a gravity switch and a microprocessor are disposed in an electronic device having a virtual image display. The gravity switch senses and provides a determination of the electronic device's orientation to the microprocessor. The microprocessor then provides a display signal to the virtual image display based on the orientation of the electronic device. A display interface provides a control signal to the microprocessor, which rotates the input from the display interface based on the orientation of the electronic device. The microprocessor includes a time hysteresis to prevent inadvertent changes to the image orientation due to vibration or other momentary movements of the electronic device.

BRIEF DESCRIPTION OF THE DRAWINGS

The present invention is better understood when read in light of the accompanying drawings, in which.

DETAILED DESCRIPTION OF THE INVENTION

Figure 1:
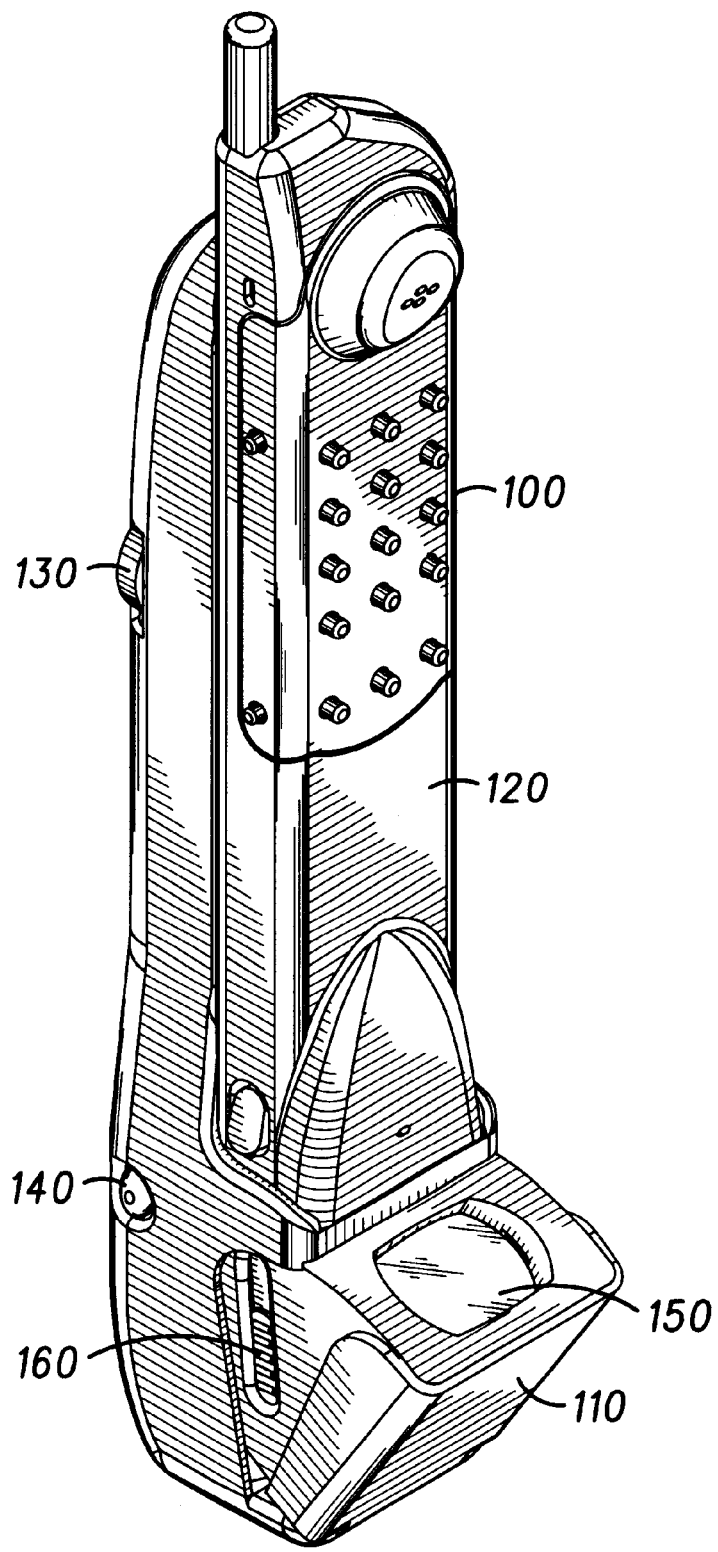
FIG. 1 is a perspective view of a portable cellular telephone having a retractable virtual image display in an open position according to the present invention.

FIG. 1 is a perspective view of a portable cellular telephone 100 showing a virtual image module 110 in an open position. Portable cellular telephone 100 includes a housing 120, a display interface 130, and a release button 140 for opening the virtual image module 110. The display interface 130 is preferably a thumb-wheel switch, but could be any other means for controlling the virtual image display. Virtual image module 110 includes a virtual image display 150 and a focal adjustment 160.

Figure 2:
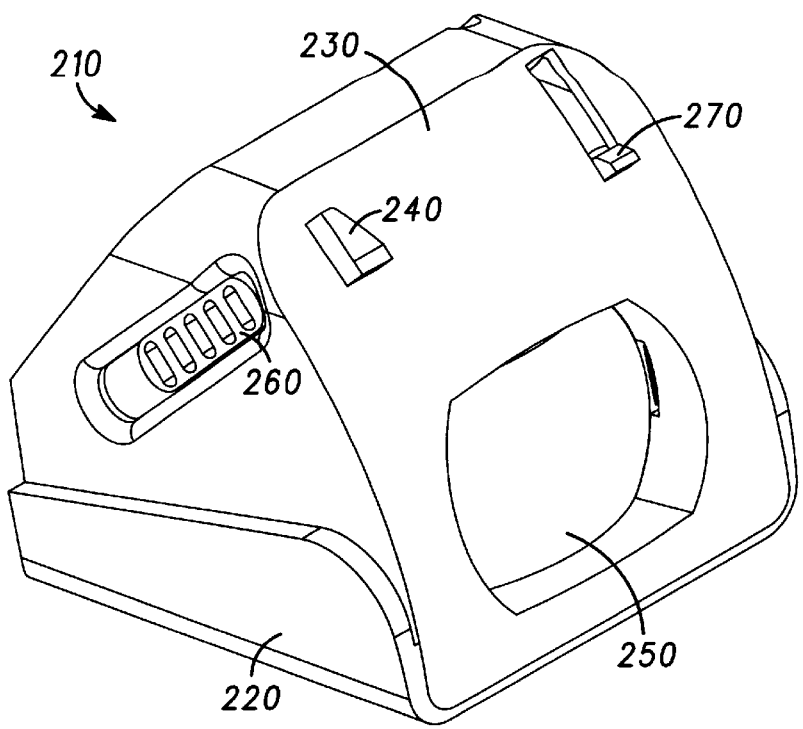
FIG. 2 is a front-perspective view of the retractable virtual image module according to the present invention.
Figure 3:
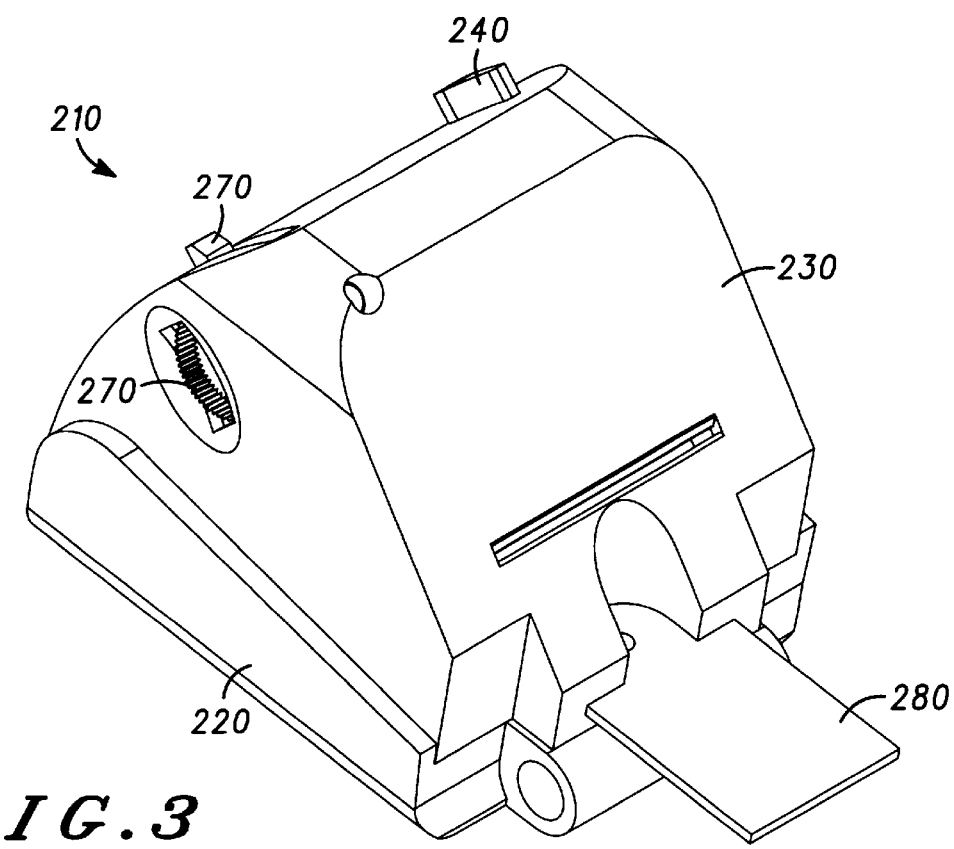
FIG. 3 is a rear-perspective view of the retractable virtual image module according to the present invention.

FIGS. 2–5 are perspective views of the virtual image module 210, which corresponds to the virtual image module 110 in FIG. 1. FIG. 2 shows a front-perspective view of the virtual image module 210, which includes an outer housing 220, an inner housing 230, a button release catch 240, a virtual image display 250, a focal adjustment 260, and a viewing angle adjustment 270. FIG. 3 shows a rear-perspective of the virtual image module 210 showing a spring 280 operatively connected to the outer housing 220.

In use, the virtual image module 210 is pivotally connected to the housing 120. Spring 280 is positioned between the virtual image module 210 and the housing 120 to bias virtual image module 210 into an open position. Although spring 280 is preferred, any other suitable biasing means could be used to hold the virtual module 210 in an open position. To close the virtual image module 210, a user would push the virtual image module 210 into the chamber formed by the housing 120. As the virtual image module 210 is closed, the button release catch 240 passes the release button 140 and locks into place. To open the virtual image module 210, a user would push the release button 140. This action releases the button release catch 240, causing the spring 280 to move the virtual image module 210 into the open position. In this mode of operation, the virtual image module 210 is a retractable virtual image module.

Figure 4:
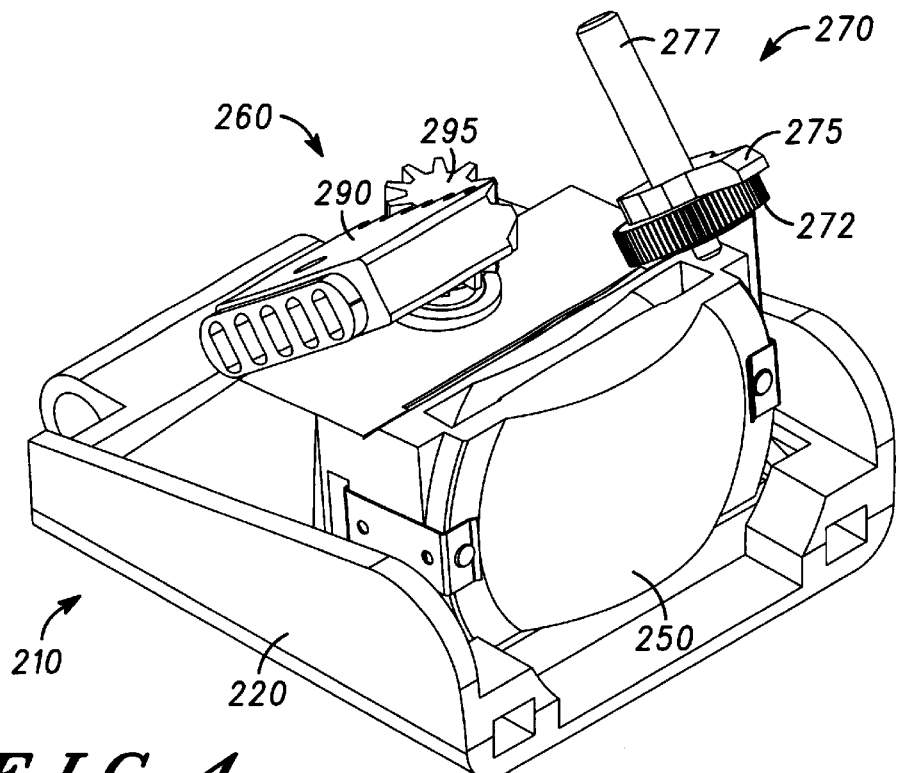
FIG. 4 is a front-perspective, inside view of the retractable virtual image module according to the present invention.
Figure 5:
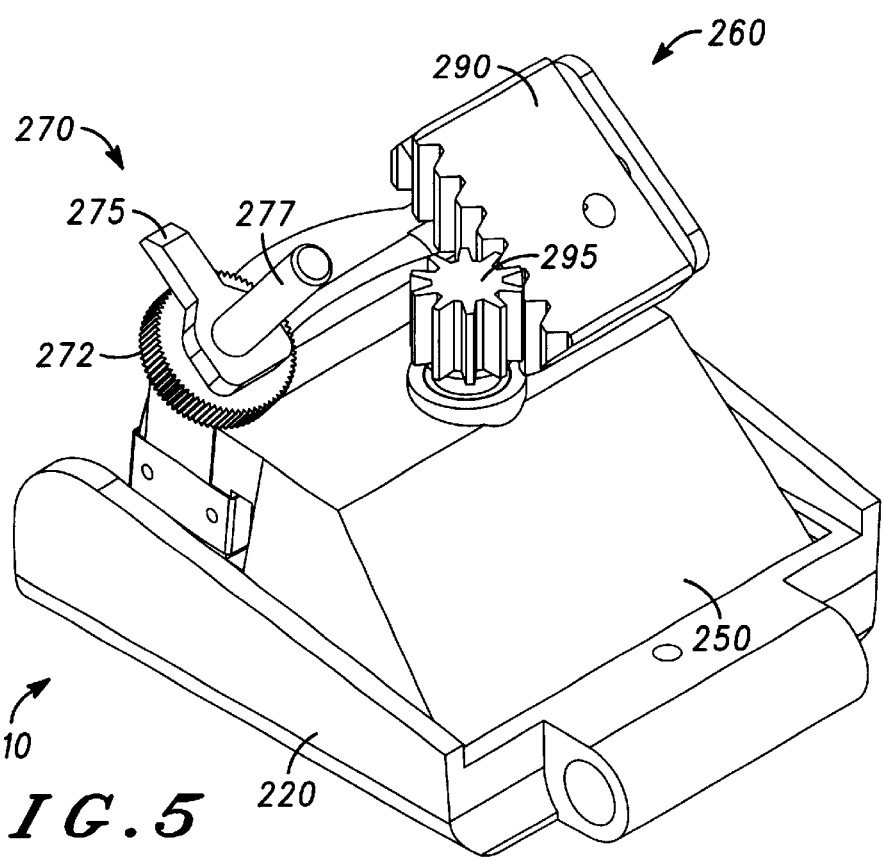
FIG. 5 is a rear-perspective, inside view of the retractable virtual image module according to the present invention.

FIGS. 4 and 5 show the virtual image module 210 with the inner housing 230 removed. The focal adjustment 260 is connected to virtual image display 250 and preferably includes a rack 290 and a pinion 295. As a user moves the focal adjustment 260, the rack 290 moves the pinion 295 thus adjusting the focus of the virtual image display 250. Although a rack and pinion assembly are preferred, other suitable mechanical and electrical means may be used for the focal adjustment 260.

The viewing angle adjustment 270 is connected to the virtual image module 210. Viewing angle adjustment preferably includes a thumb wheel 272, a stop 275, and a worm screw 277. Although the thumb wheel 272 is shown between the stop 275 and the virtual image module 210, the thumb wheel 272 could be positioned on the other side of the stop 275. Other adjusting means also may be used. In use, the virtual image module 210 is opened by pressing the release button 140. The virtual image module 210 moves into an open position by the biasing action of the spring 280. As the virtual image module 210 moves into position, the stop 275 meets the housing 120 causing the virtual image module 210 to stop. Further movement is prevented because the spring 280 biases the stop 275 against the housing 120. To adjust the viewing angle, a user turns the thumb wheel 272. The movement of the thumb wheel 272 causes the stop 275 to transition along the worm screw 277. As a result, a user can adjust the length of the arc that virtual image module 210 rotates about its pivot point with the housing 120. By adjusting the length of the arc, a user effectively is adjusting the viewing angle of the virtual image module 210. Once a user sets the viewing angle adjustment 270, the virtual image module 210 will return to the same position each time it is opened.

Figure 6:
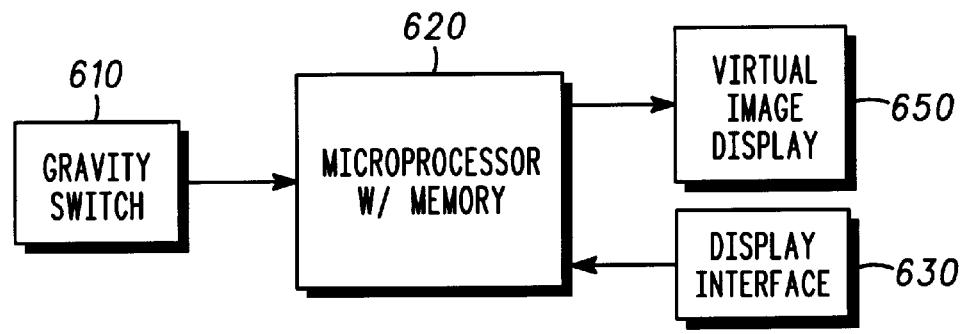
FIG. 6 is a block diagram of the electronic system according to the present invention.

FIG. 6 is a block diagram of the electronic system for the present invention. A gravity switch 610 is operatively connected to a microprocessor 620, both of which are preferably disposed in the housing 120. The microprocessor 620 preferably includes a memory. The gravity switch 610 may be any electrical or mechanical means for sensing and determining the orientation of a portable electronic device. The microprocessor 620 is operatively connected to provide a display signal to the virtual image display 650. The microprocessor 620 is operatively connected to receive a control signal from the display interface 630. The virtual image display 650 corresponds to the virtual image display 150 in FIG. 1 and to the virtual image display 250 in FIGS. 2, 4, and 5. The display interface 630 corresponds to display interface 130 in FIG. 1.

In use, the gravity switch 610 senses the current orientation of the portable cellular telephone 100 and provides a determination of the current orientation to the microprocessor 620. From this determination of the current orientation by the gravity switch 610, the microprocessor 620 ascertains the difference between the current orientation and a pre-set orientation of the portable cellular telephone 100. Using this difference, the microprocessor 620 provides a display signal to the virtual image display 650 that adjusts the image to correspond to the orientation of the portable cellular telephone 100.

When operated by a user, the display interface 630 provides a control signal to the microprocessor 620. This control signal may be to scroll through the image in a particular direction. It also may be a selection command of a particular item. The microprocessor 620 uses this difference between the current and pre-set orientations to rotate the control signal from the display interface 630 so that the control signal operates the virtual image display 650 in relation to the display orientation.

When the present invention is used, vibration or other momentary movements of the electronic device may cause the image to fluctuate or bounce between two or more positions. To avoid bouncing, the microprocessor 620 has a time hysteresis to prevent inadvertent display orientation changes. On a periodic basis, the microprocessor 620 would check for user-intended changes to the display position as well as detect for unintentional changes due to vibration or other movements of the electronic device. If the orientation changes before a predetermined time period, the assumption is the change is caused by a vibration or inadvertent movement and thus should be ignored.

Figure 7:
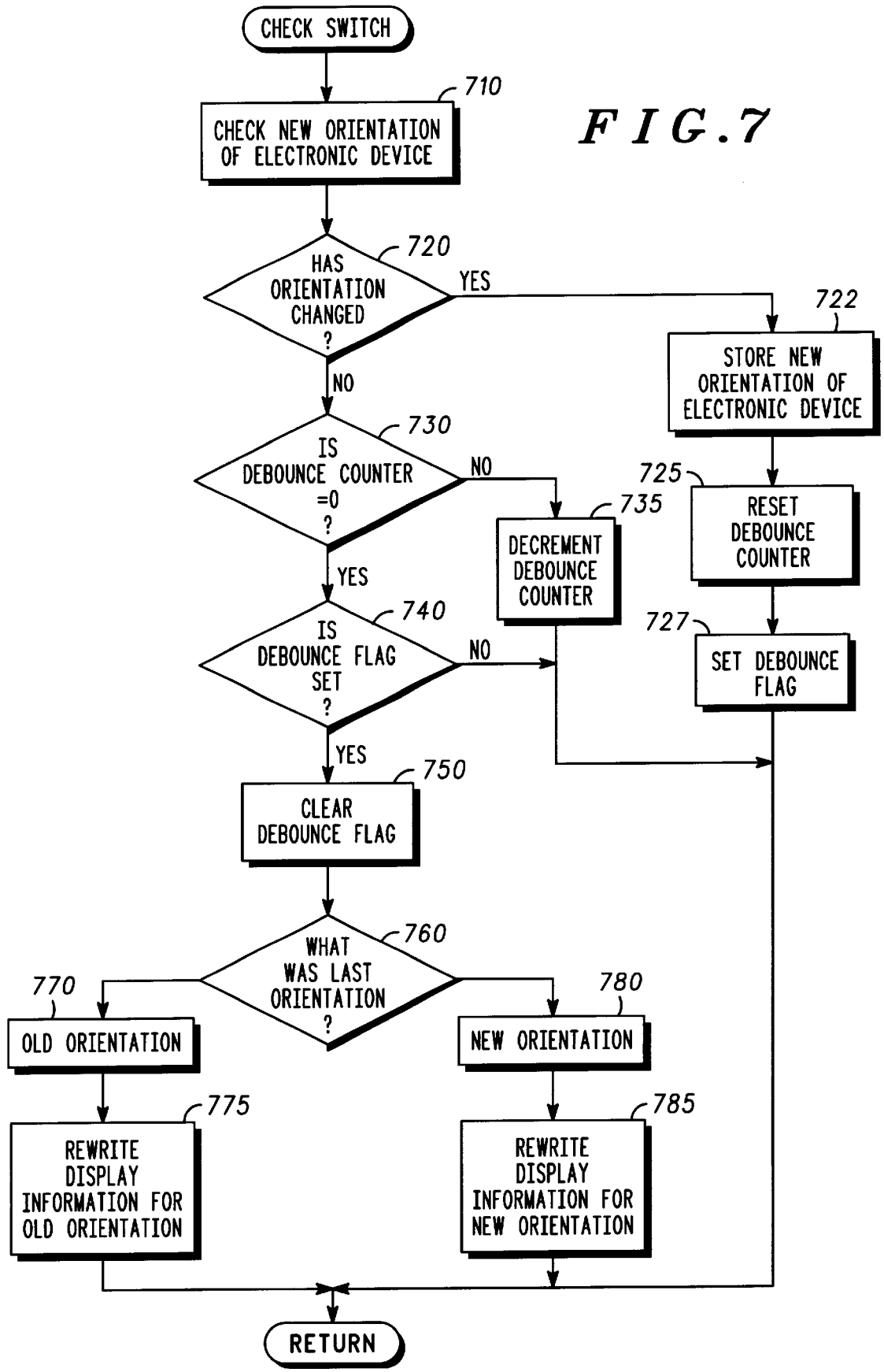
FIG. 7 is a flowchart describing a first embodiment of the debounce operation of the electronic system according to the present invention.

FIG. 7 describes a first embodiment of the debounce operation of the electronic system. In Step 710, the microprocessor 620 checks the gravity switch 610 to determine whether the orientation of the electronic device has changed in Step 720. If the orientation of the electronic device has changed, Step 722 stores the orientation of the electronic device in a memory of microprocessor 620. In Step 725, a debounce counter is reset to a predetermined value. The predetermined value is the frequency in which microprocessor 620 checks the gravity switch 610 before microprocessor 620 changes the orientation of the image on the virtual image display 650. The predetermined value may be encoded by the user. In Step 727, a debounce flag is set for the microprocessor 620 to differentiate between a debounce operation and a steady state operation of the gravity switch 610. If the debounce flag is not used, the microprocessor 620 would unnecessarily rewrite the image on the virtual image display 650 each time the debounce operation is used. The method then returns to Step 710.

If the orientation of the electronic device has not changed, the microprocessor 620 determines whether the debounce counter is equal to zero. If the debounce counter is not equal to zero, the microprocessor 620 decrements the debounce counter in Step 735. The method then returns to Step 710.

If the debounce counter is equal to zero, the microprocessor 620 determines whether the debounce flag is set in Step 740. If the debounce flag is not set, the method returns to Step 710. If the debounce flag is set, the microprocessor 650 clears the debounce flag in Step 750. In Step 760, the microprocessor 620 compares the orientation of the electronic device to its previous orientation. In Step 770, if the orientation is the same as the previous orientation, the microprocessor 620 rewrites the image in Step 775 based on the previous orientation. In Step 780, if the orientation is not the same as the previous orientation, the microprocessor 620 rewrites the image in Step 785 based on the new orientation. The method then returns to Step 710.

Figure 8:
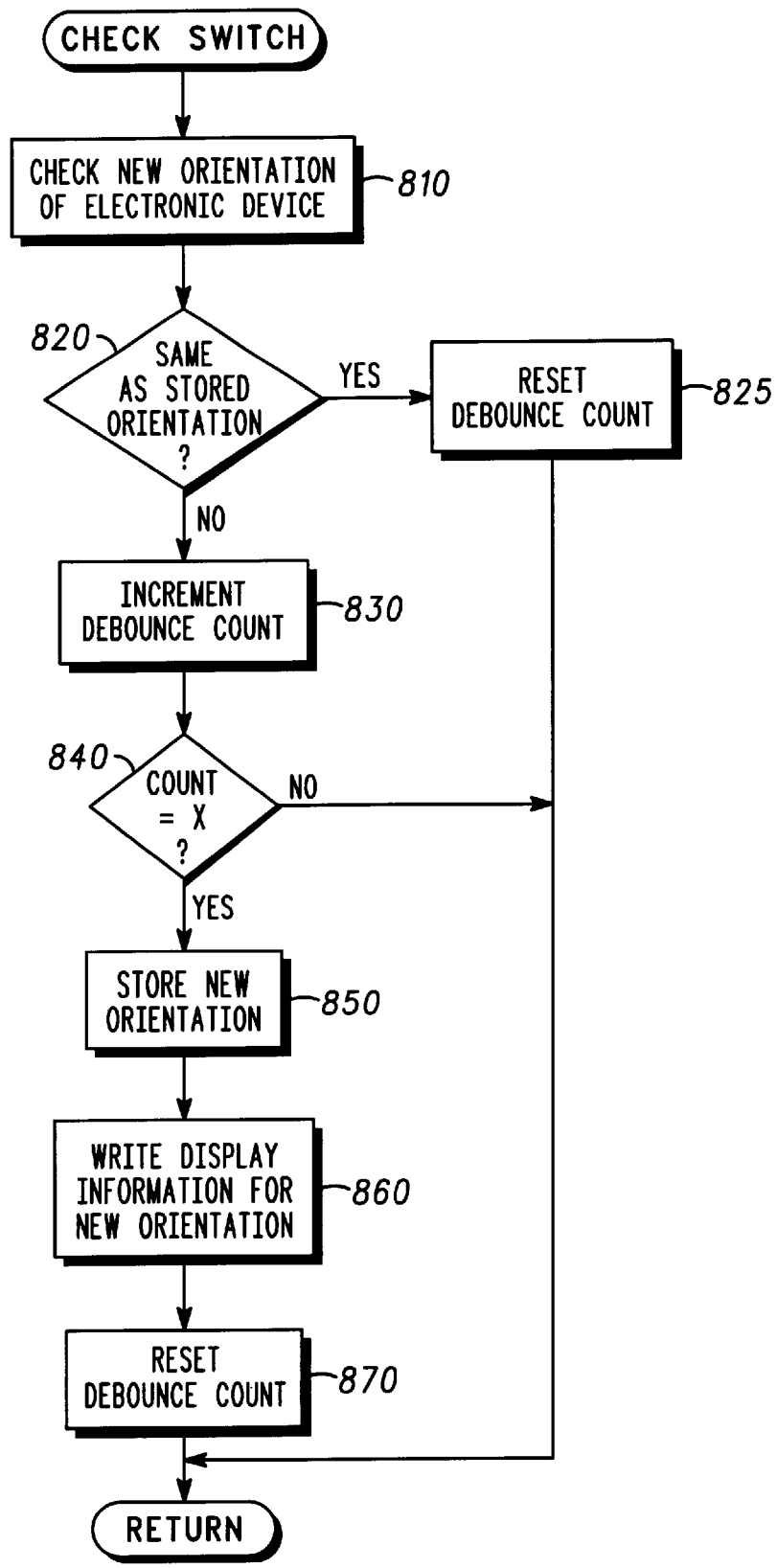
FIG. 8 is a flowchart describing an alternative embodiment of the debounce operation of the electronic system according to the present invention.

FIG. 8 describes an alternative embodiment of the debounce operation of the electronic system. In Step 810, the microprocessor 620 checks the gravity switch 610 to determine the new orientation of the electronic device. If the new orientation is the same as a stored orientation in Step 820, then microprocessor resets a debounce count in Step 825. The method then returns to Step 810.

If the new orientation is not the same as a stored orientation in Step 820, then the microprocessor 620 increments the debounce count in Step 830. If the debounce count does not equal a predetermined value (X) in Step 840, then the method returns to step 810. If the debounce count does equal a predetermined value (X) in Step 840, then the new orientation becomes the stored orientation in Step 850. In Step 860, the microprocessor 620 writes the display information to the virtual image display 650 for the new orientation. In Step 870, the debounce count is reset. The method returns to Step 810.

In the present invention, changes in the orientation of the image may affect the proper operation of the display interface 630. For example, display interface 630 may be a thumb wheel switch for scrolling through the image. When the orientation of the electronic device is the same as its preset orientation, a movement of the thumb wheel switch toward the base of the electronic device scrolls toward the bottom of the image. However, when the orientation of the electronic device is 90 degrees from its preset orientation, a movement of the thumb wheel switch toward the base of the electronic device scrolls toward the side of the image. To maintain proper operation of the display interface 630, the microprocessor 620 rotates the input from the control signal in relation to the new orientation of the image so that operation of the display interface 630 corresponds to the new orientation of the image.

Figure 9:
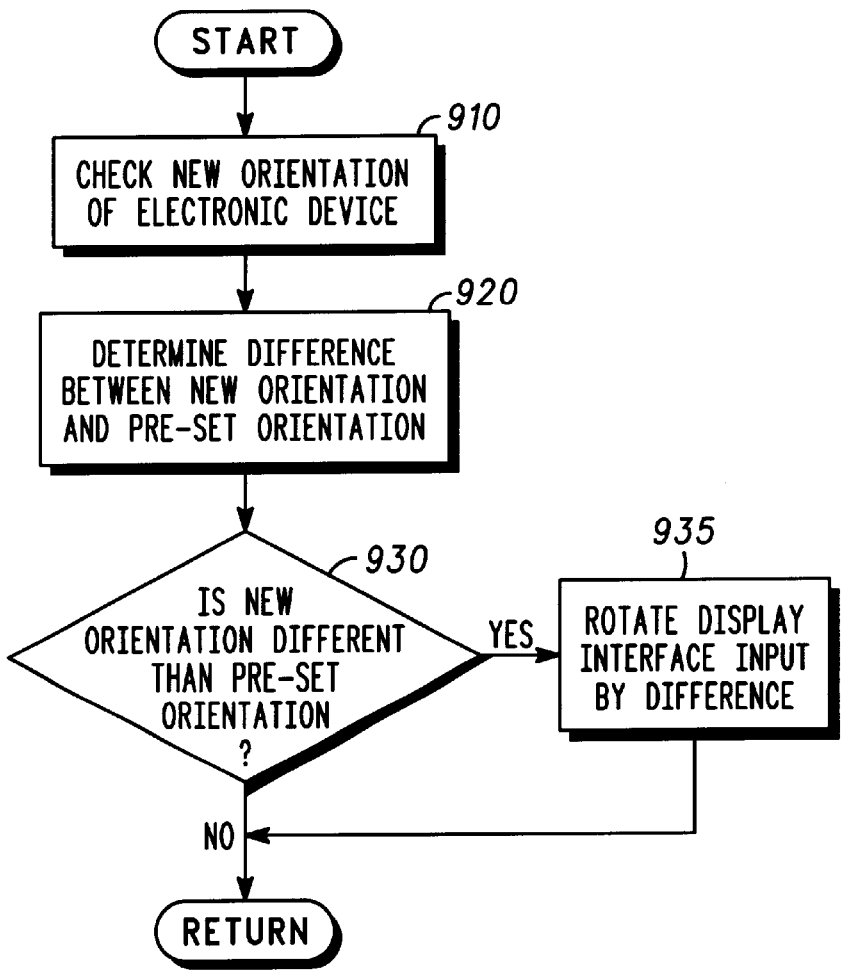
FIG. 9 is a flowchart describing the display interface operation of the electronic system according to the present invention.

FIG. 9 describes the operation of the display interface 630. In Step 910, the microprocessor 620 checks the gravity switch 610 to determine the new orientation of the electronic device. In Step 920, the microprocessor 620 determines the difference between the new orientation of the electronic device and its pre-set orientation. Preferably, the pre-set orientation is the top of the image is at the top of the electronic device. However, other pre-set orientations may be used. If the new orientation is different from the pre-set orientation in Step 930, then the microprocessor 620 rotates the input from the display interface 630 in Step 935 based on the difference between the new orientation and the pre-set orientation. The method then returns to Step 910. If the new orientation of the electronic device is not different from its pre-set orientation, then the method returns to Step 910.

The present invention has been described in connection with the embodiments shown in the figures. However, other embodiments may be used and changes may be made for performing the same function of the invention without deviating from it. Therefore, it is intended in the appended claims to cover all such changes and modifications that fall within the spirit and scope of the invention. Consequently, the present invention is not limited to any single embodiment and should be construed to the extent and scope of the appended claims.

What is claimed is:

1. A radiotelephone, comprising:

a housing forming a chamber;

a virtual image module pivotally mounted on the housing and capable of storage inside the chamber when in a closed position, the virtual image module comprising,
   a virtual image display mounted inside the virtual image module for viewing when the virtual image module is in the open position,
   a focal adjustment connected to the virtual image display for adjusting the focus of the virtual image display;

a viewing angle adjustment connected to the virtual image module for adjusting the viewing angle of the virtual image display;

sensing means disposed inside the housing to provide a determination of the orientation of the portable electronic device;

a display interface positioned on the housing to provide a control signal; and a microprocessor disposed in the housing and operatively coupled to receive the determination of the orientation of the portable electronic device from the sensing means, the microprocessor operatively connected to receive the control signal from the display interface, and the microprocessor operatively connected to provide a display signal to the virtual image display in response to the determination of the orientation of the portable electronic device and in response to the control signal, the microprocessor rotates the virtual image display based on the orientation of the electronic device and includes a time hysteresis to stabilize the virtual image display;

a button release catch connected to the virtual display module; and a release button positioned on the housing for linking with the button release catch to hold the virtual image module in a closed position.

2. A radio telephone according to claim 1, wherein the sensing means is a gravity switch.

3. A radio telephone according to claim 1, wherein the focal adjustment comprises a rack workably connected to a pinion.

4. A radio telephone according to claim 1, wherein the viewing angle adjustment comprises:

a worm screw connected to the virtual image module;

a stop movably mounted on the worm screw; and a thumb wheel movably mounted adjacent to the stop on the worm screw.

5. A portable electronic device according to claim 1, further comprising:

biasing means disposed between the housing and the virtual image module for holding the virtual image module in an open position.

6. A radio telephone according to claim 5, wherein the biasing means is a spring.

* * * * *